United States Patent [19]
Kriz et al.

[11] Patent Number: 5,473,522
[45] Date of Patent: Dec. 5, 1995

[54] MODULAR LUMINAIRE

[75] Inventors: Dale Kriz; Jerold Tickner, both of Phoenix, Ariz.

[73] Assignee: Sportlite, Inc., Phoenix, Ariz.

[21] Appl. No.: 279,955

[22] Filed: Jul. 25, 1994

[51] Int. Cl.[6] .................................................. F21S 3/02
[52] U.S. Cl. .................... 362/221; 362/219; 362/260; 362/240; 362/241
[58] Field of Search .................................... 362/221, 265, 362/225, 223, 222, 374, 375, 217, 219, 260, 307, 310, 237, 240, 241, 374

[56] References Cited

U.S. PATENT DOCUMENTS

| | | | |
|---|---|---|---|
| 3,240,928 | 3/1966 | Young | 362/225 |
| 3,624,387 | 11/1971 | Eargle, Jr. | 362/221 X |
| 4,342,072 | 7/1982 | Guritz et al. | 362/225 X |
| 4,802,073 | 1/1989 | Plumly | 362/221 X |
| 4,870,549 | 9/1989 | Lauckhardt et al. | 362/221 X |
| 5,134,553 | 7/1992 | Hasegawa | 362/225 X |
| 5,160,193 | 11/1992 | Fabbri et al. | 362/225 X |
| 5,274,533 | 12/1993 | Neary | 362/221 X |

*Primary Examiner*—Ira S. Lazarus
*Assistant Examiner*—Thomas M. Sember
*Attorney, Agent, or Firm*—LaValle D. Ptak

[57] ABSTRACT

A modular luminaire consists of a rectangular housing having a top, first and second sides and first and second ends, with an open light-emitting bottom. Elongated reflector members are located in a side-by-side relationship in the housing for independently reflecting the light from a compact fluorescent lamp from each of the reflector members out of the open bottom of the housing. The reflector members may be made as a single unit or as separate, independent individual units. The edges of the separate, individual reflector members are made to releaseably interconnect with one another; so that any desired number of reflector members and corresponding compact fluorescent lamps may be mounted in a side-by-side relationship in housings of different widths to provide the desired amount of light. Fixtures are designed to replace HID lamps and conventional, low efficiency fluorescent lamp luminaires.

19 Claims, 2 Drawing Sheets

MODULAR LUMINAIRE

RELATED APPLICATION

Co-pending application Ser. No. 08/036,822, now U.S. Pat. No. 5,377,086, assigned to the same assignee as the present application, is related to the subject matter of this application.

BACKGROUND

Commercial light fixtures for high ceilinged buildings, such as warehouses, gymnasiums, airplane hangars and the like, in recent years typically have used high intensity discharge (HID) lamp fixtures. Such fixtures use mercury vapor, metal halide, and high or low pressure sodium lamps, depending upon the particular application and the lighting characteristics desired. Such lamps generally are high wattage (400 or 1000 Watts, for example); so that in the building in which they are used, significant energy consumption takes place. This energy consumption translates into high utility bills.

Fluorescent lamp fixtures typically are lower wattage fixtures; but to provide the desired levels of illumination in high ceilinged buildings, many conventional fluorescent light fixtures must be used to produce the desired lumens of light on the floor of the building in which they are used. When standard fluorescent light fixtures using elongated tubes are employed, a larger number of fixtures is required to produce the same level of light produced with a smaller number of HID lamps.

HID lamps also produce an audible buzzing sound when they are operated. When large numbers of these lamps are used in a location, such as a warehouse, the hum or buzz produced by the lamps can be annoying. In addition, HID lamps of the mercury or metal halide variety utilize gas in a discharge tube, which is manufactured from quartz. Current passing through the gas generates light. The discharge tube is enclosed in an outer glass bulb. Consequently, the light passes through both the quartz discharge tube and the glass bulb. The discharge tubes of these lamps emit a high degree of ultraviolet radiation along with the light. Normally, the ultraviolet radiation is not of any consequence, since radiation in the harmful ranges is absorbed by the outer glass bulb. It is possible, however, for the outer bulb to be broken, leaving the structurally stronger quartz arc tube intact. In such an event, the HID lamp continues to burn; and ultraviolet radiation of harmful wavelengths is emitted directly, and is likely to strike persons working in or passing through the area beneath the lamp. On the other hand, light generated by fluorescent lamps contains no significant ultraviolet radiation. Although some ultraviolet radiation is produced within the fluorescent tubes, the ultraviolet radiation is absorbed by the glass tube. If the tube is broken, the lamp immediately extinguishes; and there is no danger from the damaging effect of uncontrolled ultraviolet radiation.

Generally, commercial fluorescent ceiling fixtures use fluorescent tubes having a length of four or eight feet. These tubes are placed in appropriate luminaires oriented parallel to the floor or ground to produce the desired illumination. Installation and replacement of fluorescent tubes, particularly eight-foot tubes, is somewhat difficult because of the length of the tubes involved. In addition, if the ballast in conventional fluorescent fixtures fails and needs replacement, it generally is necessary to remove the tubes from the fixture and to obtain access through the reflector area of the fixture from the bottom or light-emitting side in order to repair or replace the ballast.

Compact fluorescent tubes have been designed in a generally "folded over" configuration, which attach to a light fixture at one end. These compact folded fluorescent light tubes produce increased amounts of light for the same energy input, or the same wattage, compared with conventional elongated fluorescent light tubes.

The above identified co-pending application illustrates a lighting apparatus which employs a plurality of compact fluorescent lamps and which is designed to replace HID lamp fixtures or conventional fluorescent strip fixtures. The various reflectors of the lighting apparatus disclosed in this co-pending application have a generally bell-shaped configuration, with decreasing circular cross sections in planes parallel to the light-emitting end and proceeding toward the base or attachment end of the reflector.

It is desirable to provide a luminaire which may be substituted for HID lamps and standard multiple lamp fluorescent fixtures as direct replacements, which provides advantages of reduced power consumption, which is relatively inexpensive, which produces high lumen outputs, and which is modular in construction and easy to maintain.

SUMMARY OF THE INVENTION

Accordingly, it is an object of this invention to provide an improved luminaire.

It is another object of this invention to provide an improved modular reflector structure for a luminaire.

It is an additional object of this invention to provide an improved compact fluorescent lighting apparatus.

It is a further object of this invention to provide an improved luminaire using compact fluorescent lamps, having modular reflector elements, and providing ease of access to the ballasts for operating the lamps of the luminaire.

In accordance with a preferred embodiment of the invention, a luminaire for use with a plurality of elongated lamps includes a rectangular housing. The housing has a top, first and second sides, first and second ends, and an open light-emitting bottom. A plurality of elongated reflector members are attached to the housing adjacent one another. These reflector members extend between the first and second ends of the housing, and are oriented parallel to the first and second sides. The reflector members are fabricated either as a single part or as separate side-by-side units. A space is provided between the reflector members and the top of the housing; and access openings are provided in the top of the housing to provide access to the space between the top of the housing and the reflector members.

DETAILED DESCRIPTION

Reference now should be made to the drawings, in which the same reference numbers are used throughout the different figures to designate the same or similar components.

Figure 1:
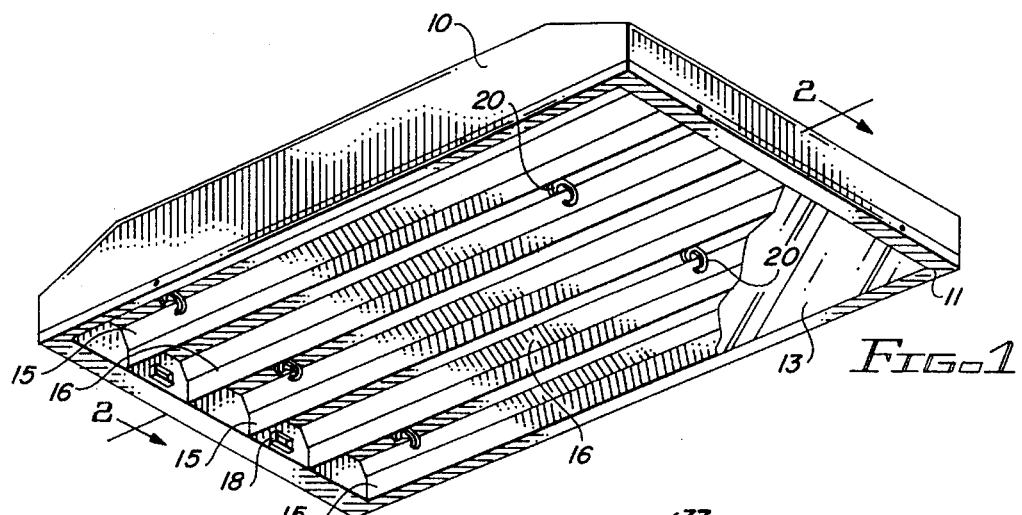
FIG. 1 is a bottom perspective view of a luminaire of a preferred embodiment of the invention.

FIG. 1 is a bottom perspective view of a preferred embodiment of the invention. The invention comprises a luminaire including modular, individual reflectors mounted within a generally rectangular housing 10. The housing 10 has downwardly depending parallel end walls interconnected with downwardly depending side walls. The housing 10 has a closed top and an open light-emitting bottom. As illustrated in FIG. 1, five separate, individual elongated reflector members include three members 15 alternating with two members 16 extending from end to end across the housing 10. The lower edges of each of the reflector members 15 and 16 are located in the plane of the open bottom of the housing 10. A lens 13 is held in place in this plane by a rim 11. As is apparent from an examination of FIGS. 1 through 4, each of the reflector members 15 and 16 have uniform cross sections throughout their length. This cross section generally is in the form of an inverted parabola consisting of five longitudinally extending flat segments, as most clearly shown in FIGS. 3 and 4. The use of these flat surfaces is chosen primarily for ease of manufacture; although parabolic or semi-circular cross-sectional configurations for the reflectors 15 and 16 also can be used, if desired.

Figure 3:
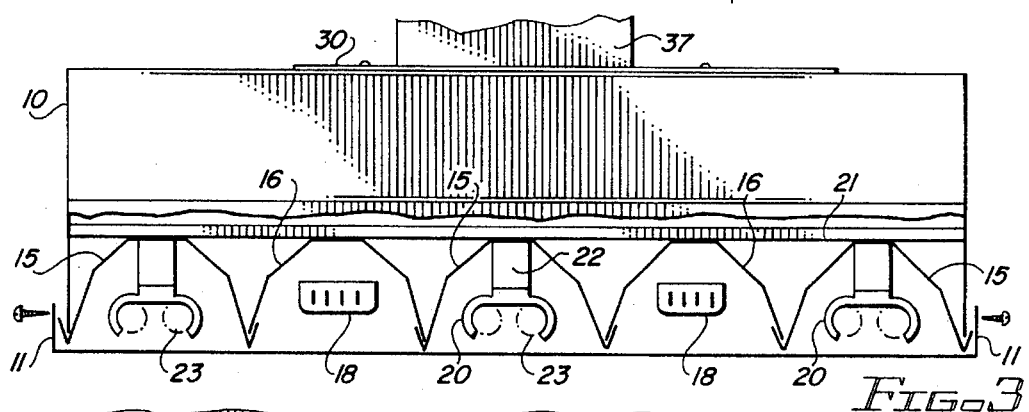
FIG. 3 is a cross-sectional view taken along the line 3—3 of FIG. 2.

The individual reflectors also may be made in a one-piece or unitary assembly having the same overall cross-sectional configuration shown in FIG. 3.

Plugs or lamp mounts 18 are provided in the left-hand end wall (as viewed in FIGS. 1 and 2), substantially in the center of each of the reflectors 16. Corresponding plugs or lamp mounts 18 (not shown) are located in the right-hand end wall for each of the reflectors 15. Compact fluorescent lamps or "folded over" fluorescent lamps, such as Dulex® compact fluorescent lamps are plugged into the sockets 18 in the corresponding ends of the reflectors 15 and 16.

Figure 4:
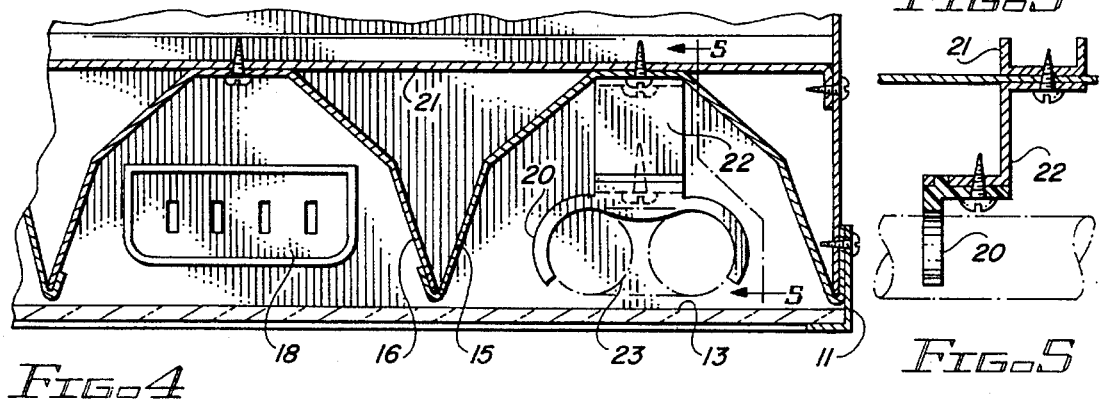
FIG. 4 is an enlarged detail of a portion of the cross-sectional view of the luminaire of FIG. 3.
Figure 5:
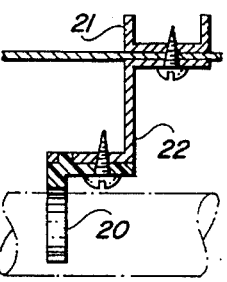
FIG. 5 is a detail of the portion circled as "5" in FIG. 2.

As is well known, compact fluorescent lamps ideally are mounted with a downward tilt of 2 degrees to 3 degrees from the base end to the opposite end. This ensures that the cold spots of the lamps are always lower than the lamp bases. The tilt prevents condensed mercury droplets from rolling back into the cathode area, and permits significant gains in system efficiency. To ensure that this tilt takes place, the ends of the lamps 23 opposite the cathode or plug-in end at the socket 18 is provided with a holder or spacer 20, typically made of resilient plastic to snap around the two extensions of the lamp 23 near the end bight. The manner in which these spacers 20 hold the lamps 23 is illustrated most clearly in FIGS. 3 and 4. FIG. 5 illustrates details of the mounting of a spacer 20 on a bracket 22, which in turn is secured through the reflector, such as the reflector 16, to a support bar 21 extending from side to side of the light fixture, as illustrated in FIGS. 3 and 4. It also should be noted that by fastening the bracket 22 in the manner illustrated, the reflector 16 also is secured in the housing to the support bar 21 to hold the reflector 16 in place at the end where the spacer 20 is located.

Figure 2:
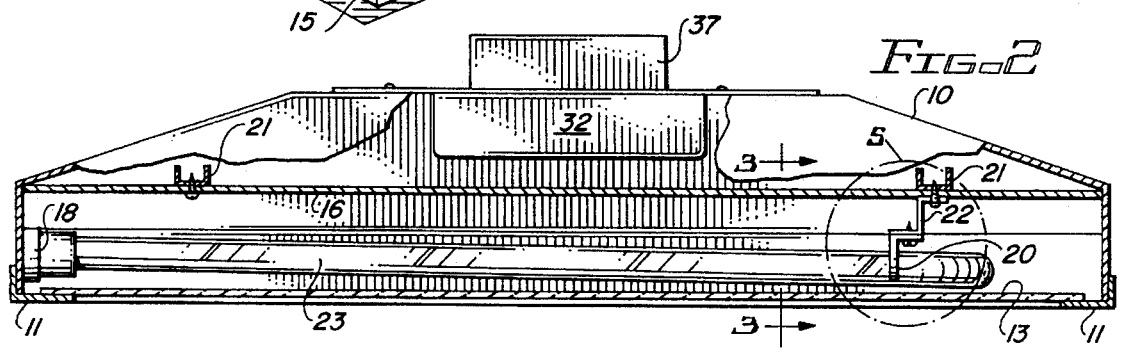
FIG. 2 is a longitudinal cross section of the luminaire of FIG. 1 taken along the line 2—2 thereof.

As shown in FIG. 2, two transverse support bars 21, located near each of the opposite ends of the housing, extend from side to side across the housing 10 to permit mounting of the reflectors 15 and 16 by use of screws or other suitable fasteners at opposite ends, as illustrated in FIG. 2. FIG. 4 shows these mountings in greater detail, with the reflector 16 of FIG. 4 shown as mounted near its plug or socket end 18 directly to the support bar 21 and the reflector 15, shown as mounted to the support bar through the bracket 22.

Each of the reflectors 15 and 16 is an independent reflector, whether made as part of a single unit or made as separate, individual interconnected units, which operates to reflect the light from a single compact fluorescent bulb 23 downwardly out of the reflector, and out of the bottom of the housing 10 of the luminaire. Each reflector 15 and 16 is attached to the support bars 21 of the housing 10, as described above. As is readily apparent from an examination of FIGS. 3 and 4, when separate, individual reflector units are used, the lower longitudinal edges of the individual reflectors 15 and 16 differ slightly from one another. The odd numbered reflectors 15 each have upturned flanges along the entire length of each of the lower edges, as most clearly illustrated in FIG. 4. In contrast, the longitudinal lower edges of the reflectors 16 terminate without any upturned or inwardly turned portions.

In constructing the modular luminaire out of a number of separate reflectors 15 and 16, the structure of the reflectors 15 is used for the odd numbered reflectors. For the reflectors 15 located at the opposite sides of the housing 10, the longitudinal flange adjacent the side of the housing is placed over the bottom edge of the housing side (or the bottom edge of the housing is caused to nest in the V-shaped groove formed by this upturned flange). The intermediate or even numbered reflectors 16 then have the outer edges thereof nested into the upwardly turned V-shaped grooves or flanges on the edges of the reflectors 15, as illustrated in FIGS. 3 and 4.

When all of the reflectors 15 and 16 are secured to the support bar 21, as described above, the result is an integral reflector system, in which each of the reflectors 15 and 16 independently causes the desired reflection from the compact fluorescent light 23 placed within it, as shown in FIG. 2. It is readily apparent that when separate, individual reflector sections 15 and 16 are used, this modular system permits ready interconnection together of any desired number of reflectors, such as 1, 3, 5, 7, etc., simply by increasing the width of the housing 10. No other design modifications need to be made; and the reflectors 15 and 16 are interconnected together in a side-by-side relationship, as illustrated in FIGS. 2 and 4, to accommodate any desired number.

Another variation of the reflector edge construction may be used by causing the upwardly turned flange to be placed along one edge of the reflector and the other edge to terminate as illustrated for the reflectors 16. Such an arrangement then could be used to permit even numbers of reflectors to be employed, since the first reflector (such as the left-most reflector 15 of FIG. 3) may have the configuration of the reflectors 15 shown in FIGS. 3 and 4. The adjacent reflector then could have a straight edge on the side adjacent the flange of the first reflector 15 and an upturned edge to accommodate the next reflector, on through to the final one on the opposite side of the housing. This modified configuration would permit construction of any desired number (odd or even) of individual reflectors into a modular luminaire, as desired.

To maximize the light reflection from the luminaire, it is preferable that the inner or reflecting surface is made of a specular material. It can be in the form of polished aluminum, silver plating, or any other desired finish which achieves this result. The design of the reflector system, using individual parabolic reflectors for each lamp, creates sustantially equal vertical and horizontal illumination at the work plane upwards to approximately one-half the distance of the mounting height (MH) up to thirty feet. The reflectors each also spread the emitted light at multiple angles which is dispersed from the luminaire.

The luminaire of FIGS. 1, 2 and 3 is designed for use as a hanging fixture, either as a canopy fixture or as a lay-in fixture to replace standard fluorescent or HID lighting fixtures. Most such fixtures require replacement of the ballast of the fixture to be effected from beneath the fixture, which means that the light bulbs and reflectors need to be removed in order to gain access to the ballast. In the embodiment shown in the drawings, access to the ballast is obtained through the top of the housing 10. This is illustrated most clearly in FIGS. 6 through 10.

Figure 6:
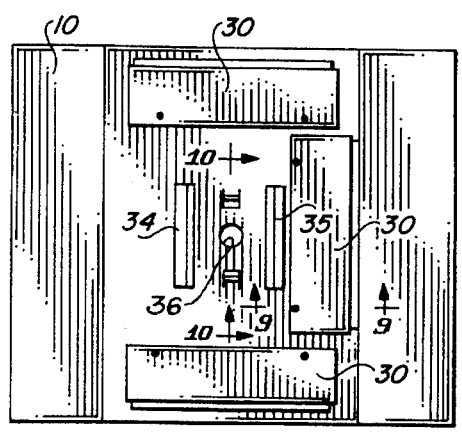
FIG. 6 is a top view of the luminaire shown in FIG. 1.
Figure 7:
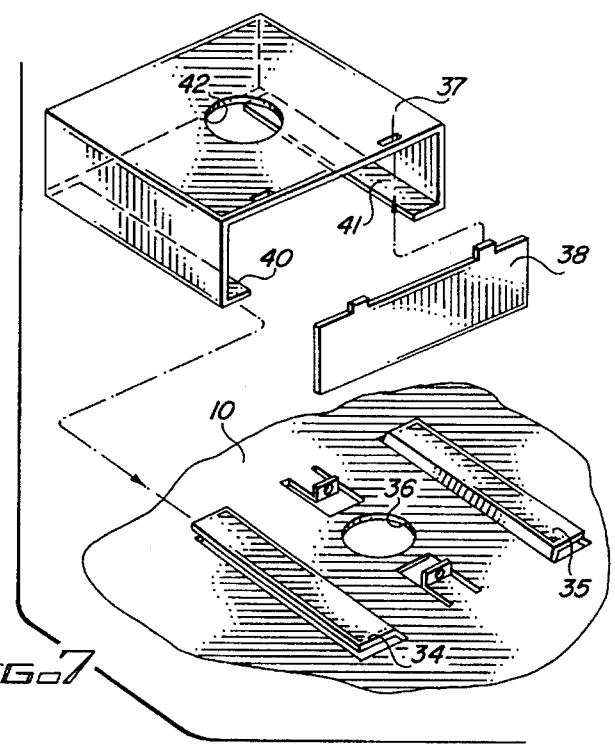
FIG. 7 is an exploded view of a detail of a portion of the top of the luminaire shown in FIGS. 2 and 6.
Figure 8:
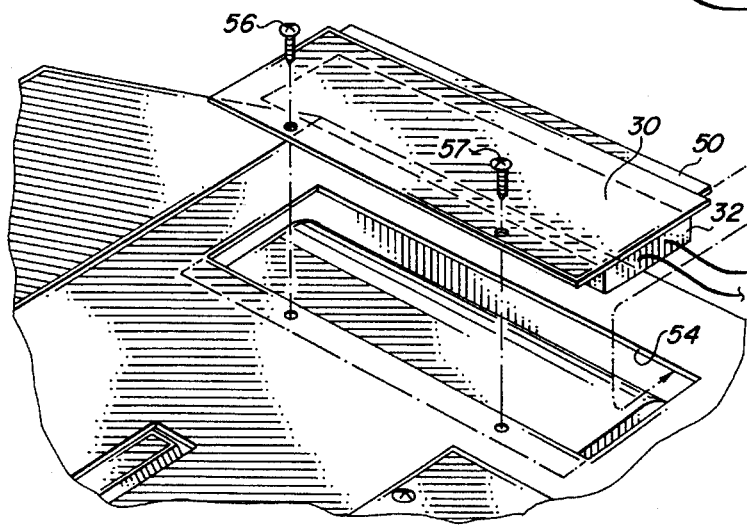
FIG. 8 is a detail of a portion of the top of the luminaire shown in FIG. 6.
Figure 9:
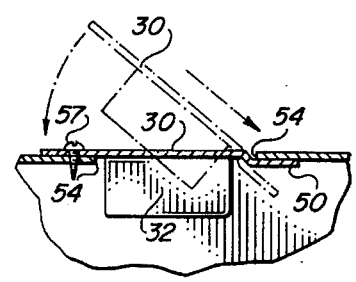
FIG. 9 is a cross-sectional side view of the portion shown in FIG. 8.
Figure 10:
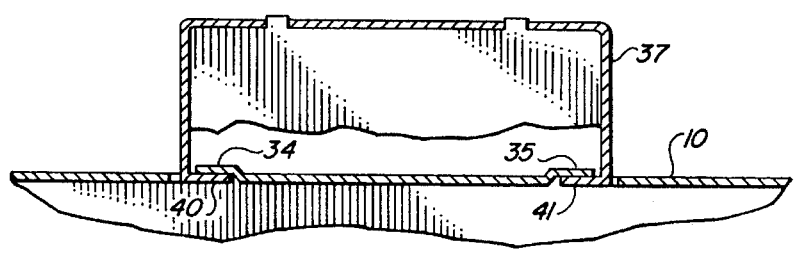
FIG. 10 is a cross-sectional view of the assembly shown in FIG. 7.

Ballast mounting plates 30 are mounted in apertures 54 located in the top of the housing 10, as illustrated in FIGS. 6 and 8. One of these plates 30 also is shown in FIGS. 2 and 3. The openings 54 in the top of the housing are greater in length and width than the corresponding dimensions of a typical ballast 32 used to operate the compact fluorescent lamps 23 mounted in the luminaire. As shown in FIG. 6, three ballast plates for holding three ballasts 32 are illustrated. The ballasts 32 are connected by any suitable means (not shown) to the undersides of the plates 30. Each of the plates 30 has an outwardly extending flange 50 designed to be inserted under one of the longitudinal edges of the opening 54 with which the plate is associated (see FIG. 9). The ends of the plate 30 and the opposite side extend beyond the opening 54; and a pair of threaded fasteners 56 and 57 (shown most clearly in FIG. 8) are used to removably secure the plates 30 in place in their respective openings 54. Consequently, whenever a ballast 32 needs to be replaced, access to the ballast 32 needing replacement is effected by removing the screws 56 and 57 and lifting the plate 30 by rocking it clockwise, as shown in FIG. 9, to the dotted line position. This permits easy access to the ballast 32. An electrical junction box for housing electrical connections to the power supply for distribution within the housing 10 of the luminaire is effected by means of a box-like housing 37 mounted on the top of the housing 10. This box 37 typically is located in the center of the top of the housing 10; and an electrical wire access hole 36 is provided in the top of the housing 10 for location within the box 37. On opposite sides of the hole 36 are a pair of upwardly extending and outwardly turned flanges 34 and 35. The box 37 is in the form of an inverted U, with an open bottom and a closed end, with two inwardly turned flanges 40 and 41 on it. These flanges are inserted beneath the corresponding flanges 34 and 35 when the box 37 is slid into place. Once it is in place, a removable side 38 having a pair of upward projections for insertion into a corresponding pair of holes on the box 37 is popped into place; and the junction box 37 then is closed over the hole 36. A wiring access hole 42 is located in the top of the box 37. Ready access to the junction box 37 and its removal is effected by reversing the process described above. FIGS. 7 and 10 most clearly show the details of this construction and the manner in which the box 37 is held in place over the hole 36.

In the case of a surface mount, the box 37 may not be necessary; so that wiring is supplied directly through the hole 36 in the top 10 of the housing. Also, for "lay-in" fixtures used for drop ceilings and the like, a flat side hookup may be used instead of the box 37.

The foregoing description of the preferred embodiment of the invention is to be considered as illustrative and not as limiting. Various changes and modifications will occur to those skilled in the art to perform substantially the same function, in substantially the same way, to achieve substantially the same result, without departing from the true scope of the invention as defined in the appended claims.

What is claimed is:

1. A luminaire for use with a plurality of elongated lamps including in combination:

a rectangular housing having a top, first and second sides, first and second ends, and an open light-emitting bottom;

a plurality of elongated reflector members attached to said housing adjacent one another and extending between said first and second ends of said housing parallel to said first and second sides thereof; said reflector members being spaced a predetermined distance from said top of said housing; and at least one access opening in the top of said housing to provide access from the top of said housing to the space between the top of said housing and said reflector members without disturbing said reflector members.

2. The combination according to claim 1 wherein the cross section of each of said reflector members is uniform throughout the length thereof and wherein each of said reflector members terminates in a pair of opposed spaced-apart parallel edges located substantially in the plane of the bottom of said housing.

3. The combination according to claim 2 wherein the cross section of each of said plurality of elongated reflector members is substantially a parabolic cross section.

4. The combination according to claim 3 wherein said plurality of elongated reflector members comprises an odd number of reflector members.

5. The combination according to claim 4 wherein said reflector members have a specular surface.

6. The combination according to claim 5 further including connectors located in at least one of said first and second ends of said rectangular housing for supporting a plurality of elongated fluorescent lamps each centered within a corresponding one of said individual elongated reflector members.

7. The combination according to claim 6 wherein said reflector members are separate reflector members and individual elongated reflector members include mating elements along the edges thereof for releaseably interconnecting the adjacent edges of said reflector members with one another.

8. The combination according to claim 7 wherein said elongated fluorescent lamps are compact fluorescent lamps each having a base and removably secured in said connectors and mounted with a downward tilt of substantially 2° to 3° from the base end thereof.

9. The combination according to claim 1 wherein said reflector members are separate individual reflector members of first and second alternating types and said first types of said separate individual elongated reflector members have the lower edges thereof bent upwardly to form continuous elongated flanges thereon, and said second types of said plurality of reflector members have the opposite edges thereof nested into said flanges of said first types of reflector members located on opposite sides thereof.

10. The combination according to claim 9 wherein the cross section of each of said reflector members is uniform throughout the length thereof and wherein each of said reflector members terminates in a pair of opposed spaced-apart parallel edges located substantially in the plane of the bottom of said housing.

11. The combination according to claim 1 wherein the cross section of each of said plurality of elongated reflector members is substantially a parabolic cross section.

12. The combination according to claim 1 wherein said plurality of elongated reflector members comprises an odd number of reflector members.

13. The combination according to claim 12 wherein said reflector members are separate reflector members of first and second alternating types, and said first types of said elongated reflector members have the lower edges thereof bent upwardly to form continuous elongated flanges thereon, and said second types of said plurality of reflector members have the opposite edges thereof nested into said flanges of said first types of reflector members located on opposite sides thereof.

14. The combination according to claim 1 further including connectors located in at least one of said first and second ends of said rectangular housing for supporting a plurality of elongated fluorescent lamps each centered within a corresponding one of said individual elongated reflector members.

15. The combination according to claim 14 wherein said elongated fluorescent lamps are compact fluorescent lamps and each having a base end removably secured in said connectors and mounted with a downward tilt of less than 4° from the base end thereof.

16. The combination according to claim 1 further including a cover for said access opening releaseably secured in said opening for supporting a fluorescent lamp ballast thereon in said space between said reflector members and the top of said housing, said cover permitting removal and replacement of a ballast attached thereto through said access opening in the top of said housing.

17. The combination according to claim 16 wherein said at least one access opening includes a plurality of access openings each having a corresponding removable cover for attachment thereto of a lamp ballast to permit access to each said lamp ballast through said access openings in the top of said housing by removal of said cover members from said corresponding access openings.

18. The combination according to claim 16 wherein said reflector members are separate reflector members of first and second alternating types and said first types of said elongated reflector members have the lower edges thereof bent upwardly to form continuous elongated flanges thereon, and said second types of said plurality of reflector members have the opposite edges thereof nested into the flanges of said first types of reflector members located on opposite sides thereof.

19. The combination according to claim 18 wherein the cross section of each of said reflector members is uniform throughout the length thereof and wherein each of said reflector members terminates in a pair of opposed spaced-apart parallel edges located substantially in the plane of the bottom of said housing.

* * * * *